United States Patent
Lee et al.

(10) Patent No.: US 10,146,105 B2
(45) Date of Patent: Dec. 4, 2018

(54) AROUND-VIEW CAMERA DEVICE

(71) Applicant: Chicony Electronics Co., Ltd., New Taipei (TW)

(72) Inventors: Wen-Pin Lee, New Taipei (TW); Chi-Jen Chen, New Taipei (TW)

(73) Assignee: Chicony Electronics Co., Ltd., New Taipei (TW)

( * ) Notice: Subject to any disclaimer, the term of this patent is extended or adjusted under 35 U.S.C. 154(b) by 0 days.

(21) Appl. No.: 15/816,101

(22) Filed: Nov. 17, 2017

(65) Prior Publication Data
US 2018/0157151 A1    Jun. 7, 2018

(30) Foreign Application Priority Data

Dec. 5, 2016   (TW) .............................. 105140150 A (51) Int. Cl.
    G03B 17/02    (2006.01)
    G03B 37/00    (2006.01)
    G03B 37/04    (2006.01)

(52) U.S. Cl.
    CPC ............. *G03B 17/02* (2013.01); *G03B 37/00* (2013.01); *G03B 37/04* (2013.01); *G03B 2217/002* (2013.01)

(58) Field of Classification Search
    None
    See application file for complete search history.

(56) References Cited

U.S. PATENT DOCUMENTS

| | | | |
|---|---|---|---|
| 2014/0168443 A1* | 6/2014 | Aguilar | H04N 7/183 348/158 |
| 2016/0098138 A1 | 4/2016 | Park et al. | |
| 2016/0381257 A1* | 12/2016 | Kuo | H04N 5/2252 348/38 |
| 2017/0195533 A1* | 7/2017 | Seo | G02B 7/021 |
| 2017/0310857 A1* | 10/2017 | Chung | H04N 5/2252 |
| 2017/0310895 A1* | 10/2017 | Masuda | H04N 5/23238 |

FOREIGN PATENT DOCUMENTS

| | | |
|---|---|---|
| CN | 202385174 U | 8/2012 |
| CN | 203801008 U | 8/2014 |
| JP | 2016076202 | 5/2016 |

* cited by examiner

*Primary Examiner* — William B Perkey
(74) *Attorney, Agent, or Firm* — Muncy, Geissler, Olds & Lowe, P.C.

(57) ABSTRACT

An around-view camera device includes a camera body, two around-view lenses, and a counterweight piece. The camera body includes two openings, a casing, and a circuit board, where the two openings are respectively provided on two opposite sides of the casing, and the circuit board is disposed within the casing. The two around-view lenses are respectively accommodated within the two openings of the camera body and are separately electrically connected to the circuit board. The counterweight piece is disposed on a side, different from sides of the two around-view lenses, of the casing or the circuit board far away from a center of gravity of the camera body.

10 Claims, 7 Drawing Sheets

AROUND-VIEW CAMERA DEVICE

CROSS-REFERENCE TO RELATED APPLICATION

This non-provisional application claims priority under 35 U.S.C. § 119(a) to Patent Application No. 105140150 filed in Taiwan, R.O.C. on Dec. 5, 2016 the entire contents of which are hereby incorporated by reference.

BACKGROUND

Technical Field

The present invention relates to a camera structure, and in particular, to an around-view camera device.

Related Art

In modern times when photographing devices are popular, most people record moments of the life by using cameras. With the development of a digital technology, functions of cameras gradually become diverse, for example, image stabilization, red eye reduction, and auto focus. However, a common camera performs photographing from a visual angle. Therefore, if an around-view photo is intended to be obtained, multiple photos need to be spliced and composited. This takes time and a lot of work, and a splicing operation easily produces errors.

In view of the above, an around-view camera is developed in the market, and the around-view camera covers a full visual angle of 360-degree space by setting multiple groups of cameras. Therefore, a user may directly obtain a 360-degree round-view photo after pressing down a shutter. However, because lenses of the around-view camera have a large quantity and are respectively disposed on different side surfaces, if accidentally dropping in a using process, lenses may be crashed and destroyed.

SUMMARY

In view of the above, in an embodiment, an around-view camera device is provided, including: a camera body, two around-view lenses, and a counterweight piece. The camera body includes two openings, a casing, and a circuit board, where the two openings are respectively provided on two opposite sides of the casing, and the circuit board is disposed within the casing. The two around-view lenses are respectively accommodated within the two openings of the camera body and are separately electrically connected to the circuit board. The counterweight piece is disposed on a side, different from sides of the two around-view lenses, of the casing or the circuit board far away from a center of gravity of the camera body.

Thus, in the embodiments of the present invention, the center of gravity of the around-view camera device is transferred to the side of the casing by mounting the counterweight piece on the casing or the circuit board far away from the center of gravity of the camera body, so that when the around-view camera device accidentally drops, the around-view lenses can be avoided to be directly crashed, thereby achieving a function of protecting the lenses.

In an embodiment, the around-view camera device may be an externally connected around-view camera. The casing is provided with a notch, and the notch is far away from the counterweight piece. The circuit board further includes a connecting teiminal, and the connecting terminal corresponds to the notch, so that the around-view camera device can be externally connected to a related product (for example, a smartphone, a tablet computer, or a driving recorder) by using the connecting terminal. In addition, by means of the setting that the notch is far away from the counterweight piece, the connecting terminal can be made to be far away from a side provided with the counterweight piece, and when the around-view camera device accidentally drops, a risk for the connecting terminal to be crashed can be reduced.

In an embodiment, the around-view camera device may be a wireless around-view camera, and the circuit board includes a wireless communication module (for example, a WiFi module, a Bluetooth module, an 802.11 module, or a ZigBee module), to perform wireless communication connection with a related product by using the wireless communication module. In addition, the wireless communication module may be located at a side, far away from the counterweight piece, of the circuit board, and when the around-view camera device accidentally drops, an impact force applied to the wireless communication module can be reduced so as to avoid damage.

DETAILED DESCRIPTION

Figure 1:
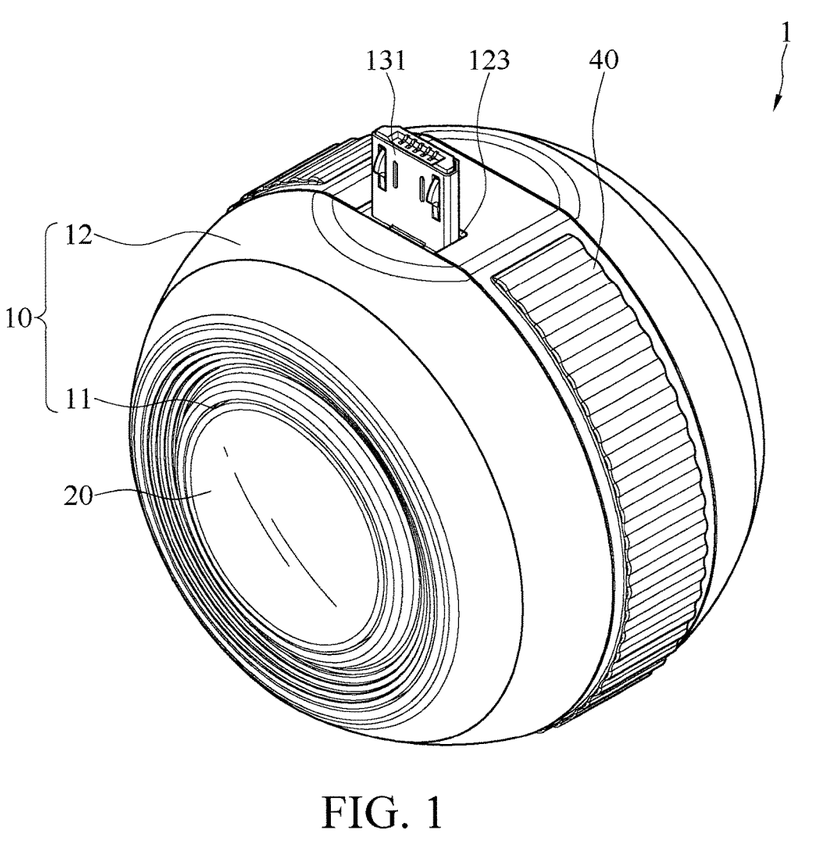
FIG. 1 is a three-dimensional view of a first embodiment of an around-view camera device according to the present invention.
Figure 2:
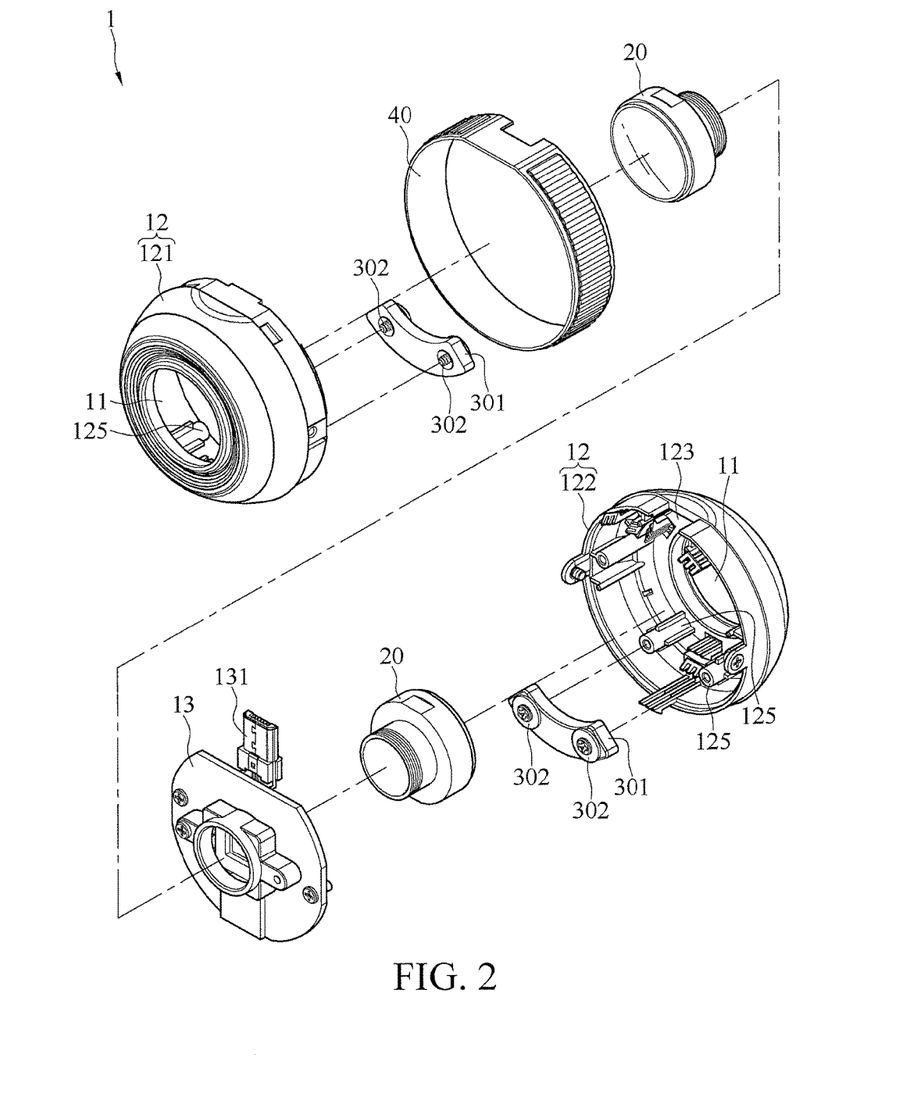
FIG. 2 is a three-dimensional exploded view of the first embodiment of the around-view camera device according to the present invention.
Figure 3:
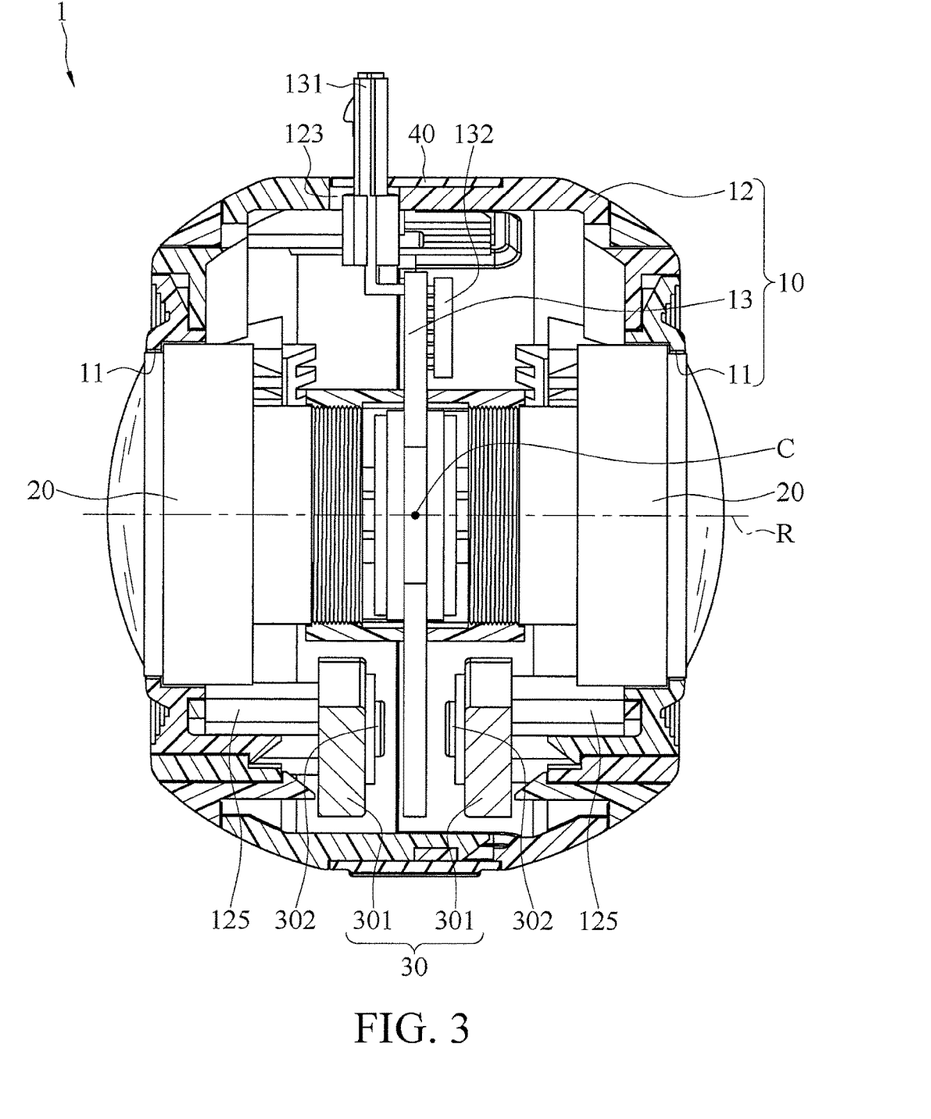
FIG. 3 is a sectional view of the first embodiment of the around-view camera device according to the present invention.

FIG. 1, FIG. 2, and FIG. 3 are a three-dimensional view, a three-dimensional exploded view, and a sectional view of a first embodiment of an around-view camera device according to the present invention. Referring to FIG. 1 and FIG. 2, the around-view camera device 1 in this embodiment includes a camera body 10, two around-view lenses 20, and a counterweight piece 30. For ease of description, an example in which the around-view camera device 1 is in a shape of a three-dimensional ball is used herein. In some embodiments, the around-view camera device 1 may be square, oblong, oval, or of another irregular shape. This embodiment is not limited thereto.

As shown in FIG. 1 to FIG. 3, the camera body 10 includes two openings 11, a casing 12, and a circuit board 13. The two openings 11 are respectively provided on two opposite sides of the casing 12. The circuit board 13 is fastened within the casing 12 (for example, the circuit board 13 may be fastened within the casing 12 by means of locking, adherence, embedding, or the like). In this embodiment, the casing 12 is formed by butting two annular housing components 121 and 122, so that the casing 12 is in a shape of a circular ring on the whole. The circuit board 13 is crossed between the two openings 11. The openings 11 may be disposed corresponding to shapes of the around-view lenses 20. For example, the around-view lenses 20 are circular, and the openings 11 may be provided as circular openings.

As shown in FIG. 2 and FIG. 3, the two around-view lenses 20 are respectively accommodated within the two openings 11 of the camera body 10, and the two around-view lenses 20 are separately electrically connected to the circuit board 13, so that the two around-view lenses 20 can communicate with the circuit board 13. The around-view lenses 20 may be fastened on the circuit board 13 or the casing 12. For example, the around-view lenses 20 may be fastened on the circuit board 13 in a screwing manner (as shown in FIG. 3). In an embodiment, the around-view lenses 20 may be wide-angle lenses or fisheye lenses and exposed from the openings 11. In addition, a sum of maximum visual angles of the two around-view lenses 20 is greater than or equal to 360 degrees. For example, a scope of visual angles of the around-view lenses 20 may be 0 to 140 degrees. When a user operates the around-view camera device 1 to perform photographing, the circuit board 13 may process images captured by the two around-view lenses 20 and obtain a 360-degree around-view image.

In an embodiment, the counterweight piece 30 may be a metal, plastic, a ceramic block body, or an electronic element such as a battery, and the counterweight piece 30 is disposed on the casing 12 or the circuit board 13 far away from a center of gravity of the camera body 10. For example, the counterweight piece 30 may be fastened at a position near the casing 12 or the circuit board 13 by means of screwing, adhesion, embedding, or the like, so that the counterweight piece 30 is located at a side, different from sides of the two around-view lenses 20, of the camera body 10, so that the whole center of gravity of the around-view camera device 1 can bias towards a side not provided with the around-view lenses 20. For example, as shown in FIG. 3, when the counterweight piece 30 is not mounted, the center C of gravity of the camera body 10 is approximately at a central position of the whole. The camera body 10 may be distinguished as an upper half part and a lower half part that are opposite to each other by using a reference surface R passing through the center C of gravity and the two openings 11, and the counterweight piece 30 may be mounted on the upper half part or the lower half part. For example, the counterweight piece 30 may be mounted on the casing 12 or the circuit board 13 located at the lower half part so that the whole center of gravity of the around-view camera device 1 can bias towards a side not provided with the around-view lenses 20, and when the around-view camera device accidentally drops, the around-view lenses can be avoided to be directly crashed, thereby achieving a function of protecting the lenses.

Figure 4:
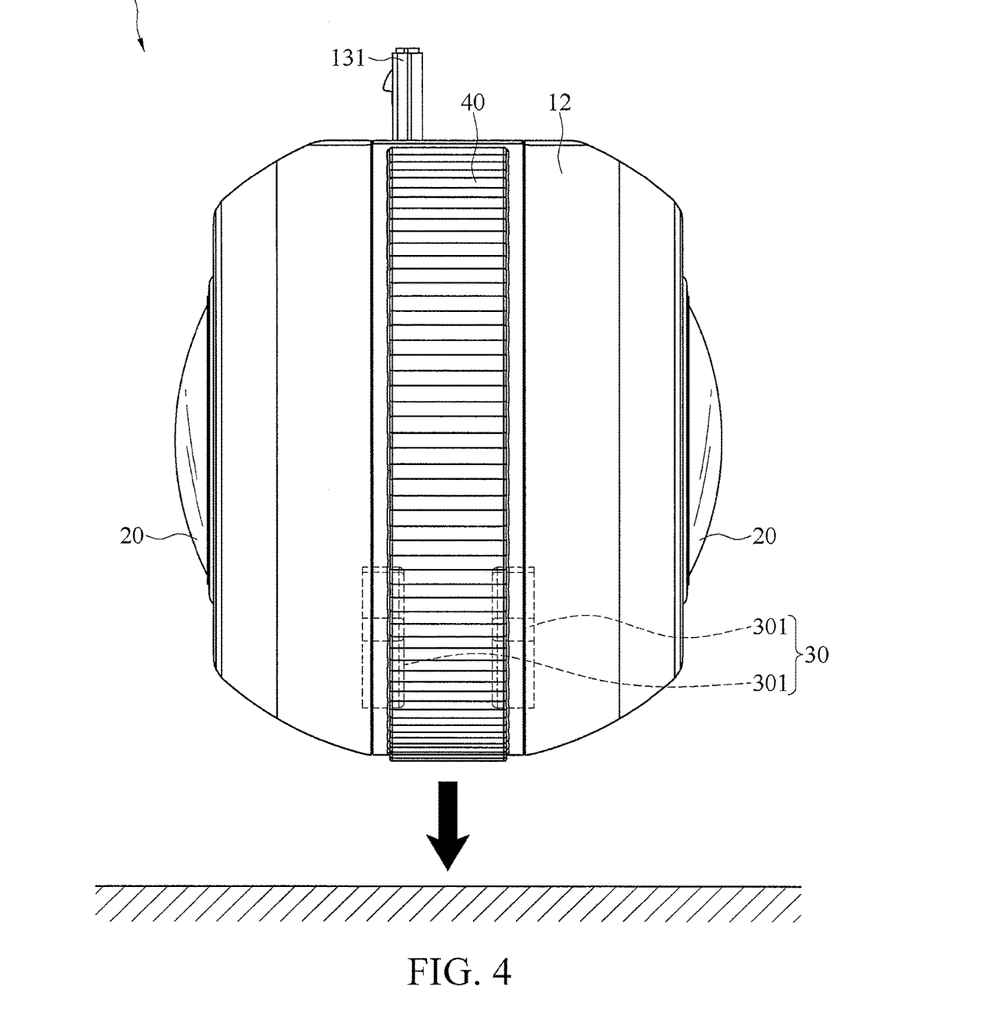
FIG. 4 is a schematic dropping diagram of the first embodiment of the around-view camera device according to the present invention.
Figure 5:
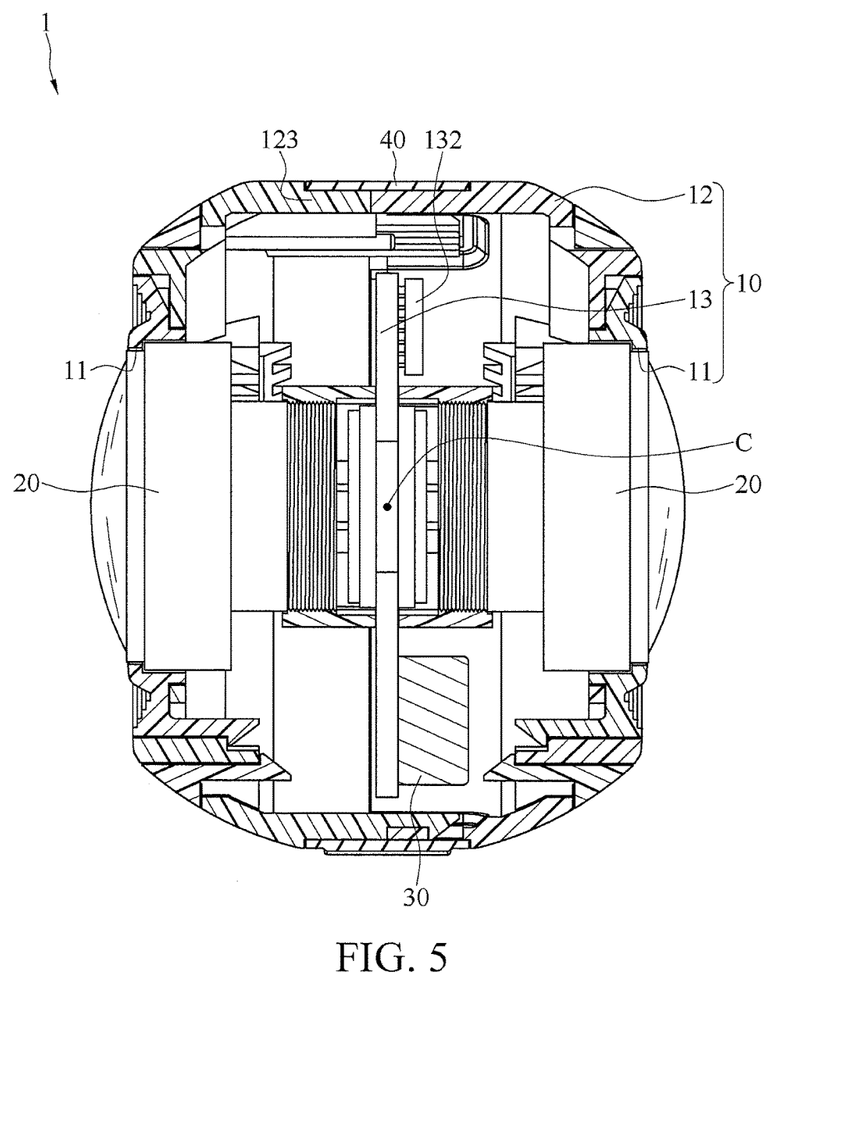
FIG. 5 is a sectional view of a second embodiment of an around-view camera device according to the present invention.

In an embodiment, the counterweight piece 30 may be a counterweight block or consist of multiple counterweight blocks. As shown in FIG. 2 and FIG. 3, the counterweight piece 30 in this embodiment includes two counterweight blocks 301. The two counterweight blocks 301 are located in the casing 12 and are respectively disposed on two opposite surfaces of the circuit board 13, so that counterweights of the two opposite surfaces of the circuit board 13 are equal. The counterweight blocks 301 are separately assembled at one side of the casing 12 by using a fastening piece 302 (which is a screwing piece herein). In this embodiment, the casing 12 is provided with multiple radial raised ribs 125 in an inwards integrated and raised manner, for the counterweight blocks 301 to fasten by using the fastening pieces 302, so that the whole center of gravity of the around-view camera device 1 can bias towards a side provided with the counterweight piece 30. Thus, as shown in FIG. 4, when the around-view camera device 1 accidentally drops, in a dropping process, the side, provided with the counterweight piece 30, of the around-view camera device 1 is affected by the gravity to maintain a state of facing downwards. Therefore, when the around-view camera device 1 falls to the ground, the side provided with the counterweight piece 30 first strikes the ground, to avoid that the around-view lenses 20 are directly crashed, thereby achieving a function of protecting the lenses. In some embodiments, as shown in FIG. 5, the counterweight piece 30 may be implemented by a counterweight block.

In an embodiment, the around-view camera device 1 may be an externally connected around-view camera. As shown in FIG. 2 and FIG. 3, the casing 12 may be provided with a notch 123. The circuit board 13 includes a connecting terminal 131 (a connecting terminal such as a USB, a Micro USB, or an HDMI), and the connecting terminal 131 threads out from the notch 123, so that the around-view camera device 1 may be connected to a port of a related product (for example, a smartphone, a tablet computer, or a driving recorder) by means of the connecting terminal 131 to transmit data with each other.

In an embodiment, the notch 123 is provided at a side, far away from the counterweight piece 30, of the casing 12. For example, assuming that the counterweight piece 30 is adjacent to a lower side of the casing 12, the notch 123 may be provided at an upper side, a left side, or a right side of the casing 12, so that the connecting terminal 131 is far away from a side provided with the counterweight piece 30. Thus, when the around-view camera device 1 accidentally drops, the connecting terminal 131 can be avoided to be crashed, thereby achieving a protection function. Preferably, as shown in FIG. 2 and FIG. 3, the notch 123 and the counterweight piece 30 are separately located at two opposite sides of the center C of gravity of the camera body 10, so that the connecting terminal 131 can be located at a side, farthest away from the counterweight piece 30, of the casing 12, so as to reduce a chance for the connecting terminal 131 to be crashed.

As shown in FIG. 3, in an embodiment, the circuit board 13 of the camera body 10 may further include a wireless communication module 132 (for example, a WiFi module, a Bluetooth module, an 802.11 module, or a ZigBee module), so that the around-view camera device 1, in addition to being connected to a related product by means of the connecting terminal 131, can be in wireless communication connection with a related product by using the wireless communication module 132. In an embodiment, the wireless communication module 132 may be located at a side, far away from the counterweight piece 30, of the circuit board 13. For example, assuming that the counterweight piece 30 is adjacent to a lower side of the circuit board 13, the wireless communication module 132 may be disposed at an upper side, a left side, or a right side of the circuit board 13. Preferably, as shown in FIG. 2 and FIG. 3, the wireless communication module 132 and the counterweight piece 30 are respectively located at two opposite sides of the center C of gravity of the camera body 10, so that the wireless communication module 132 can be located at a side, farthest away from the counterweight piece 30, of the circuit board 13. Thus, when the around-view camera device 1 accidentally drops, an impact force applied to the wireless communication module 132 can be reduced so as to avoid damage.

In some embodiments, the wireless communication module 132 and the counterweight piece 30 may be located at a same side of the center C of gravity of the camera body 10.

As shown in FIG. 2 and FIG. 3, in an embodiment, a belt loop 40 may further be sleeved outside the casing 12 of the around-view camera device 1, so that the belt loop 40 protrudes from a surface of the casing 12. Thus, as shown in FIG. 4, when the around-view camera device 1 accidentally drops, the belt loop 40 first strikes the ground so that the casing 12 is avoided to be worn, achieving an advantage of further protecting the casing 12. In some embodiments, the belt loop 40 may be a hard ring body made of a material such as metal or plastic, or the belt loop 40 may be an elastic buffer ring made of a material such as plastic, rubber, or silica gel, so that an effect of buffering can be further achieved when the around-view camera device 1 accidentally drops.

FIG. 5 is a sectional view of a second embodiment of an around-view camera device according to the present invention. As shown in FIG. 5, this embodiment differs from the first embodiment in that the around-view camera device 1 is a wireless around-view camera and does not include the connecting terminal 131, and the circuit board 13 of the camera body 10 includes the wireless communication module 132 (for example, a WiFi module, a Bluetooth module, an 802.11 module, or a ZigBee module), to perform wireless communication connection with a related product by using the wireless communication module 132. In some embodiments, the wireless communication module 132 and the counterweight piece 30 are respectively located at two opposite sides of the center of gravity of the camera body 10, so that the wireless communication module 132 can be far away from the side, provided with the counterweight piece 30, of the around-view camera device 1. Thus, when the around-view camera device 1 accidentally drops, an impact force applied to the wireless communication module 132 can be reduced so as to avoid damage.

Figure 6:
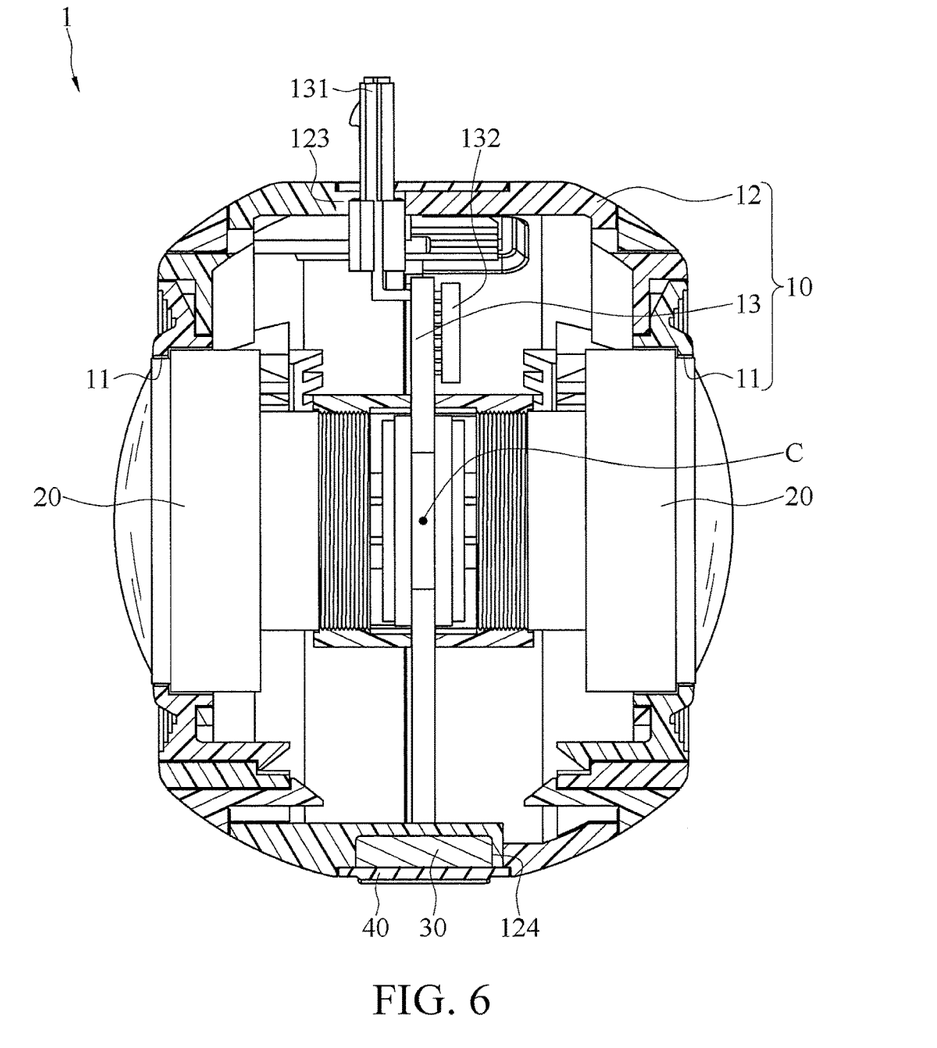
FIG. 6 is a sectional view of a third embodiment of an around-view camera device according to the present invention.

In an embodiment, the counterweight piece 30 of the around-view camera device 1 may be disposed outside the casing 12, making assembly more convenient. For example, FIG. 6 is a sectional view of a third embodiment of an around-view camera device according to the present invention. This embodiment differs from the first embodiment in that the counterweight piece 30 is fastened in a groove 124 outside the casing 12, and the belt loop 40 is covered outside the counterweight piece 30, so that the counterweight piece 30 is protected by the belt loop 40, and the belt loop 40 can shield the counterweight piece 30 so that the counterweight piece 30 is hidden between the belt loop 40 and the casing 12, increasing aesthetics of the around-view camera device 1.

Figure 7:
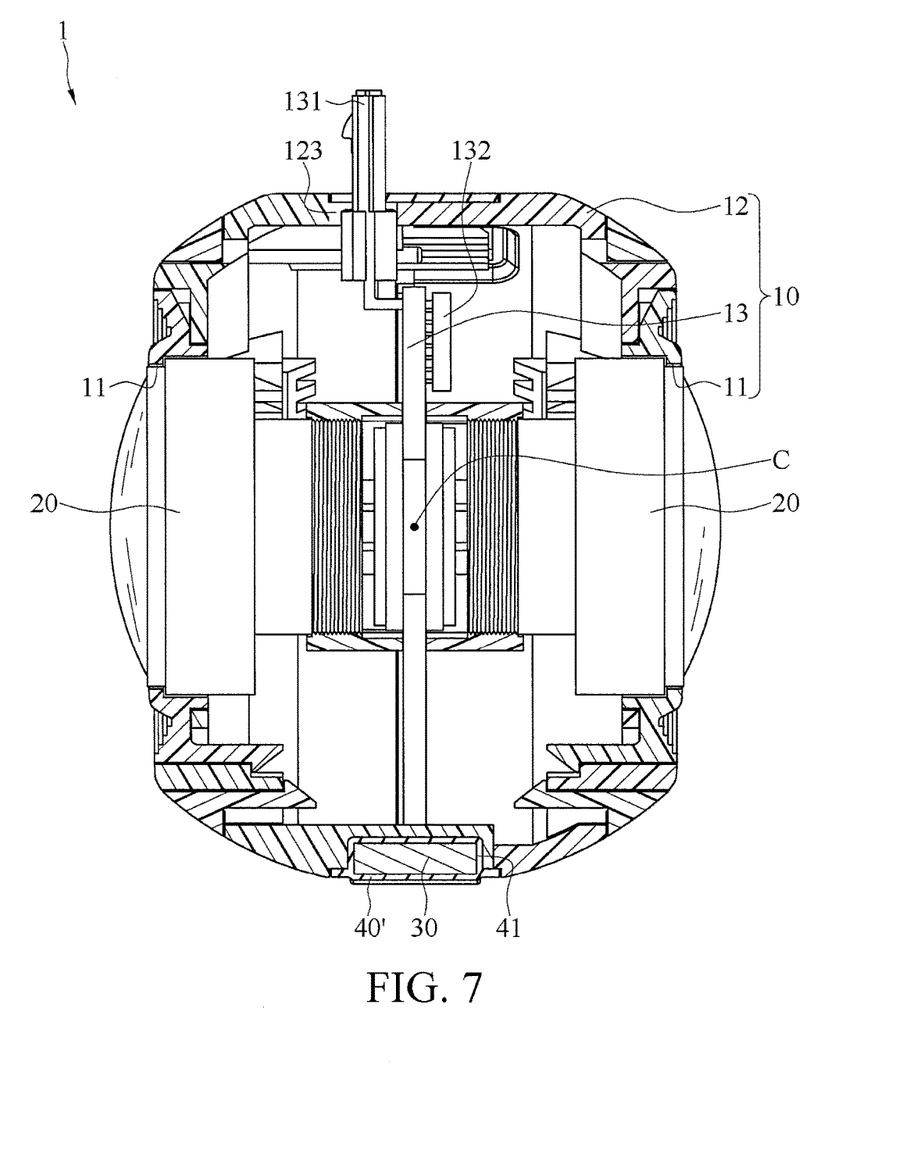
FIG. 7 is a sectional view of a fourth embodiment of an around-view camera device according to the present invention.

As shown in FIG. 7, FIG. 7 is a sectional view of a fourth embodiment of an around-view camera device according to the present invention. This embodiment differs from the third embodiment in that the counterweight piece 30 may also be inbuilt in the belt loop 40'. For example, a hollow groove 41 may be provided in the belt loop 40', and the counterweight piece 30 is accommodated within the hollow groove 41, so that the belt loop 40' can be coated outside the counterweight piece 30, to achieve a function of fastening and protecting the counterweight piece 30, and the counterweight piece 30 is made to be hidden in the belt loop 40', to increase aesthetics of the around-view camera device 1.

In view of the above, in the embodiments of the present invention, the center of gravity of the around-view camera device is transferred to the side of the casing by mounting the counterweight piece on the casing or the circuit board far away from the center of gravity of the camera body, so that when the around-view camera device accidentally drops, the around-view lenses can be avoided to be directly crashed, thereby achieving a function of protecting the lenses.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. An around-view camera device, comprising:
    a camera body, comprising two openings, a casing, and a circuit board, wherein the two openings are respectively provided on two opposite sides of the casing, and the circuit board is disposed within the casing;
    two around-view lenses, respectively accommodated within the two openings of the camera body and separately electrically connected to the circuit board; and
    a counterweight piece, disposed on a side, different from sides of the two around-view lenses, of the casing or the circuit board far away from a center of gravity of the camera body;
    wherein the casing is further provided with a notch, the notch is far away from the counterweight piece, the circuit board further comprises a connecting terminal, and the connecting terminal corresponds to the notch.

2. The around-view camera device according to claim 1, wherein the notch and the counterweight piece are respectively located on two opposite sides of the center of gravity of the camera body.

3. An around-view camera device, comprising:
    a camera body, comprising two openings, a casing, and a circuit board, wherein the two openings are respectively provided on two opposite sides of the casing, and the circuit board is disposed within the casing;
    two around-view lenses, respectively accommodated within the two openings of the camera body and separately electrically connected to the circuit board; and
    a counterweight piece, disposed on a side, different from sides of the two around-view lenses, of the casing or the circuit board far away from a center of gravity of the camera body;
    wherein the circuit board comprises a wireless communication module, the wireless communication module is far away from the counterweight piece, and the wireless communication module and the counterweight piece are respectively located on two opposite sides of the center of gravity of the camera body.

4. An around-view camera device, comprising:
    a camera body, comprising two openings, a casing, and a circuit board, wherein the two openings are respectively provided on two opposite sides of the casing, and the circuit board is disposed within the casing;
    two around-view lenses, respectively accommodated within the two openings of the camera body and separately electrically connected to the circuit board; and
    a counterweight piece, disposed on a side, different from sides of the two around-view lenses, of the casing or the circuit board far away from a center of gravity of the camera body;

wherein the counterweight piece comprises two counterweight blocks, and the two counterweight blocks are respectively disposed on two opposite surfaces of the circuit board.

5. The around-view camera device according to claim 1, further comprising a belt loop, wherein the belt loop is sleeved outside the casing.

6. The around-view camera device according to claim 5, wherein the counterweight piece is inbuilt in the belt loop.

7. The around-view camera device according to claim 5, wherein the counterweight piece is disposed outside the casing, and the belt loop is covered on the counterweight piece.

8. The around-view camera device according to claim 5, wherein the belt loop is a buffer ring.

9. The around-view camera device according to claim 6, wherein the belt loop is a buffer ring.

10. The around-view camera device according to claim 7, wherein the belt loop is a buffer ring.

* * * * *